Jan. 25, 1944.   F. A. SABIA   2,340,021
PRODUCTION OF CATALYSTS
Filed Aug. 1, 1940
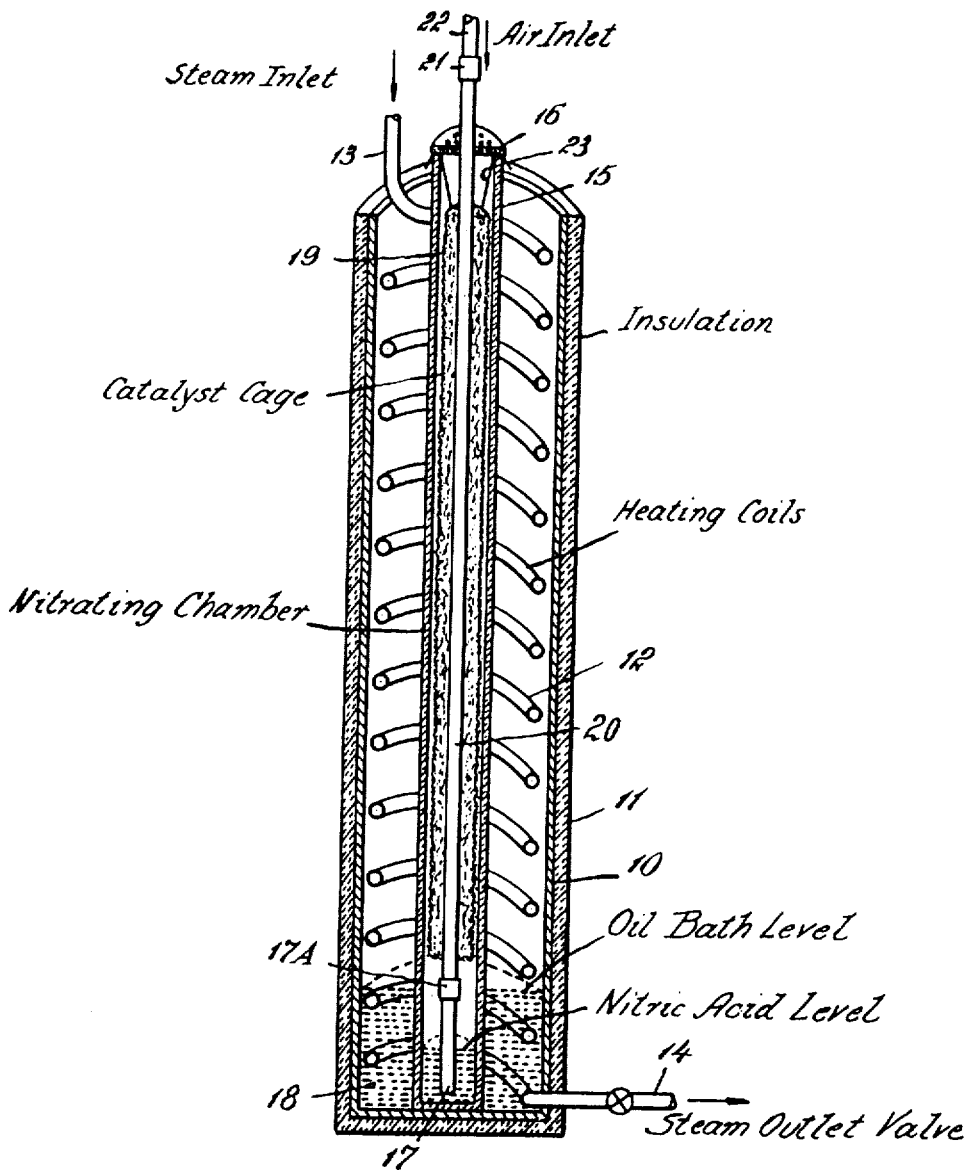
INVENTOR
Frank A. Sabia
BY Gordon A. Wilkins
ATTORNEY Patented Jan. 25, 1944

2,340,021

UNITED STATES PATENT OFFICE 2,340,021

PRODUCTION OF CATALYSTS

Frank Anthony Sabia, Cliffside Park, N. J., assignor, by mesne assignments, to Allied Chemical & Dye Corporation, a corporation of New York Application August 1, 1940, Serial No. 349,160

10 Claims. (Cl. 252—255)

This invention relates to catalysts for use in various catalytic processes such as hydrogenation, dehydrogenation and oxidation and more particularly to the production of nickel catalysts for use in such processes.

In catalyzing hydrogenation, dehydrogenation and oxidation of organic materials, it is advantageous to employ as the catalyst, nickel or nickel coated masses having a surface layer or film of catalytically active nickel oxide. Such catalysts may be arranged in bulk or space form, e. g. as assemblies of wire gauze or cages of catalytic particles, and possess the advantage over catalysts of the powder type, especially in continuous operations, that they can more readily be uniformly distributed throughout the path of flow of reacting vapors and reacted materials and more readily continuously separated from the reaction products. Furthermore, such catalysts are desirable for the reason that they may be prepared, reactivated, introduced into and removed from the reaction chambers as masses of substantial size as distinguished from small particles, thereby greatly facilitating handling of the catalysts. Moreover, metal base catalysts aid in distribution and transfer of heat of reaction, particularly in vapor phase exothermic reactions where a low rate of vapor flow is employed, and facilitate temperature control in such reactions.

Heretofore, it has been proposed to prepare nickel catalysts by subjecting the nickel to prolonged contact with nitric acid vapors at relatively low temperature to coat the nickel with nickel nitrate and then decompose the nitrate. For example, Gwynn Patent No. 2,191,464 of February 27, 1940, discloses treating nickel for several hours with the vapors of nitric acid at a temperature of from 40° to 50° C. to pit the surface of the nickel and form a surface layer containing nickel nitrate, after which the nitrate is decomposed by heating the coated nickel in air followed by oxidation in a hypohalite solution. Such processes involve prolonged and excessive condensation of nitric acid vapors on the surface of the nickel and such abundant condensate tends to dissolve the nickel by reaction and to wash off the nickel nitrate film formed, thus seriously limiting the adherence, depth and durability of the nitrate film and of the catalytic film formed by decomposition of the nitrate. Furthermore, the prior art processes are subject to substantial nickel losses incident to removal of nitrate from the nickel.

It is an object of the invention to provide an improved process for the production of nickel catalysts by treatment of nickel with nitric acid vapors.

It is a further object of the invention to provide a process for the production of a more adherent, thicker and more durable nickel nitrate layer than has heretofore been obtainable on nickel catalysts of the bulk type without substantial loss of nickel.

It is another object of the invention to provide a novel apparatus for the preparation of catalysts. Other objects and advantages will appear hereinafter.

In accordance with the invention hot nitric acid vapors are passed over nickel maintained initially at a temperature below the condensation point of the vapors, preferably below 120° C. so that they condense on the nickel and react therewith to form a surface layer of hydrated nickel nitrate and then the temperature of the nickel is raised above the condensation temperature of the nitric acid vapors, i. e. above about 140° C., preferably above 165° C. while continuing passage of the vapors over the nickel. Preferably the nickel is maintained at a temperature such that the nitric acid vapors condense thereon for only a relatively short time, e. g. from 10 to 30 minutes; the period during which the vapors are passed over the nickel without condensation thereof is preferably of substantially longer duration, e. g. from 1 to 2 hours. The nitrate coating is then decomposed by oxidation or reduction, as hereinafter more fully explained. The process is applicable to the reactivation of spent catalyst and preparation of catalyst from nickel oxide as well as from fresh nickel. The process hereinabove described has been found to produce a thicker oxide coating on the nickel than other known methods, requires less time for its practice, removes catalyst poisons, and produces an active and more durable catalyst than other known methods at less cost. While the explanation for these and other advantages of this invention which will appear from the following detailed description thereof are not fully understood, one possible explanation is that under the conditions of my invention the vapors initially contacting the nickel condense on the surface of the nickel for a relatively short time, substantially all of the nitric acid and water vapor being converted to nickel nitrate apparently in the form of the hexahydrate or some lesser hydrate and by thus limiting the amount of condensate there is little tendency for nickel nitrate coating thus formed to be washed or dissolved off. These conditions, as above noted, are maintained for a relatively short period of time. In the continued operation, as the temperature of the nickel rises, condensation of the nitric acid vapors ceases and some water is driven off from the molten hydrated nitrate coating. After cessation of condensation of the nitric acid vapors, the vapors are absorbed by the film of molten nitrate on the nickel and attack the metal at the interface of the molten film and the metal thus increasing the thickness of the film.

The process may be carried out in apparatus involving an acid-resistant nitrating chamber adapted to receive a cage or other body of nickel, which chamber is surrounded by a vessel equipped with heating means such as a steam coil for raising the temperature of the nickel within the nitrating chamber at the desired rate. Preferably a body of nitric acid of a concentration of about from 65 to 75 per cent is maintained in the lower portion of the nitrating chamber below the catalyst and a tube extends into the body of acid so that air passed through the tube bubbles up through the acid and carries the vapors upwardly into contact with the nickel. The body of nitric acid may be maintained at boiling temperature by a hot bath of oil or other liquid within the lower portion of the vessel and surrounding the lower portion of the nitrating chamber.

For a more complete understanding of the invention, reference should be had to the accompanying drawing showing for purposes of exemplification a sectional view in perspective of one form of apparatus in accordance with the invention.

In the drawing reference numeral 10 designates a cylindrical iron vessel closed at its lower end and open at its upper end and provided on the outside with thermal insulation 11. Located within the vessel 10 is a steam coil 12 arranged spirally around the entire height of the interior of the vessel and equipped with a steam inlet 13 and a valved outlet 14. Arranged within the steam coil is an elongated cylindrical glass nitrating chamber 15 having a closed lower end and equipped with a perforated porcelain cover 16. A mineral oil or other liquid bath 18 within the cylinder 10 surrounds the lower portion of the glass chamber 15. Reference numeral 19 designates a nickel screen catalyst cage of smaller diameter than the glass chamber, containing nickel turnings, wool, screen or the like, equipped with a nickel tube 20 extending centrally throughout the length of the cage and above the top and below the bottom thereof. The lower end of the tube 20 is joined to the glass tube 17 by connector 17A above the surface of the body of nitric acid so that the nickel tube is not immersed in the acid. The upper end of the tube is connected by any suitable means 21, e. g., union, to the air or other gas inlet 22. The catalyst cage is held in place in the nitrating chamber by suspension hooks 23 fixed to the top of the catalyst cage and hung from the lip of the nitrating chamber 15.

In the production of catalysts in accordance with the invention, steam is passed through the coil 12 to heat the nitrating chamber 15 and the zone surrounding the same to the desired temperature and the oil bath is heated to a temperature above the boiling point of the nitric acid in the nitrating chamber 15, thus causing the nitric acid to boil. Heating of the oil bath may be accomplished either by the steam coil 12 or by an additional source of heat such as an auxiliary steam coil (not shown) immersed in the oil. The catalyst cage is then lowered into the nitrating chamber and suspended from the lip of the nitrating chamber 15 by the hooks 23 on the top of the catalyst cage. Air or other gas is passed through the glass tube 17 from air inlet 22 and bubbled up through the nitric acid, thus promoting the permeation of nitric acid vapors through the catalyst cage. However, it is not necessary for the air passing through tube 20 to bubble up through the liquid acid; the connector 17A and glass tube 17 may be omitted and the air may be discharged over the body of nitric acid so as to sweep the acid vapors up through the catalyst mass. Under certain conditions, e. g., short catalyst cages or loosely packed catalyst cages, it has been found possible to omit the air stream and still obtain satisfactory nitration of the catalyst mass. The nickel is at a temperature below the condensation point of the nitric acid vapors so that the vapors condense on the metal and react therewith to form hydrated nickel nitrate. The steam passed through the steam coil 12 is at such temperature that the temperature of the catalyst is raised quickly, i. e. in about 10 to 30 minutes, to above the condensation temperature of the nitric acid vapors. Thereafter, the exothermic reaction between nickel and nitric acid yields sufficient heat to raise the temperature of the catalyst above about 165° C. at which temperature water begins to come off from the molten hydrated nickel nitrate film. After condensation ceases, the film of molten nickel nitrate on the catalyst absorbs nitric acid vapors which further attack the metal at the interface of the metal and molten nitrate, thus causing the nitrate film to become heavier, thicker and more strongly adherent to the metal. The metal may gain up to 12 per cent in weight owing to the growth of the nitrate layer. Thereafter the catalyst may be removed from the apparatus and the nitrate film decomposed in any desired manner; for example, oxidation by heating the catalyst in air, anodic oxidation, hypohalite oxidation or reduction in the presence of hydrogen.

The invention is applicable to the production of catalysts from fresh nickel or nickel oxide, e. g. nickel turnings, wool, rings, gauze, nickel deposited on a metallic or non-metallic support by spraying, rolling, drawing, electro-deposition, etc., porous supports such as pumice and asbestos impregnated with metallic nickel or nickel oxide, and to the reactivation of spent catalysts. In reactivating spent catalysts, the invention effectively removes many contaminants which seriously interfere with catalyst activity, e. g. sulfur and sulfur compounds, organic matter such as residues resulting from the vapor phase hydrogenation of phenol, carbonaceous materials and inorganic contaminants may be completely or largely removed. Sintered metal and nickel oxide which have been rendered inactive due to overheating may be substantially completely reactivated, i. e. converted to or covered with catalytically activated nickel oxide in accordance with the invention. In some cases it may be desirable to nitrate spent catalysts in accordance with the invention and wash the nitrated catalyst with water or a dilute solution of an acid such as hydrochloric acid or acetic acid to remove some contaminants such as inorganic contaminants which form soluble nitrates and carbonaceous material, e. g. a wash with a 10 per cent hydrochloric acid solution may be utilized for eliminating iron compounds.

In the specification and claims, the reference to preparation, production or preparing of the catalyst is intended to include the original production of catalyst and also the reactivation of spent catalyst and the term "nickel" is used in a broad sense to include nickel in form of oxide as well as metallic nickel.

As illustrative of the production of catalyst in accordance with the invention, the following examples are given:

*Example I*

A cylindrical iron vessel 10 of 6" diameter and 42" height containing a cylindrical glass nitrating chamber 15, 2½" in diameter and 48" high was employed. Mineral oil was introduced into the vessel to a depth of 6" and concentrated nitric acid of a specific gravity of 1.42 (about 70% concentration) was placed in the chamber to a depth of about 3". Steam at a gauge pressure of from 50 to 60 pounds per square inch and a temperature of from about 145° to 155° C. was passed through the steam coil heating the oil bath to a temperature above about 140° C. and raising the nitric acid to its boiling point. A nickel screen cage 2" in diameter and 36" long filled with nickel turnings and having a ¼" diameter nickel tube about 38" long centrally located in the cage was introduced at room temperature into the nitrating chamber so that the lower end of the tube 20 was about 1" to 2" above the level of the nitric acid. Air was passed downwardly through the nickel tube and over the body of the nitric acid at a rate of from .2 to .3 cubic foot per hour, thus assisting nitric acid vapors to ascend into contact with the nickel. Owing to the relatively cool condition of the nickel as compared with the nitric acid vapors, the vapors condensed on the nickel and reacted therewith to form a uniform coating of hydrated nickel nitrate: $Ni(NO_3)_2.6H_2O$. Within from 15 to 20 minutes the heat from the exothermic reaction, supplemented by the heat of the steam coil 12, raised the temperature of the nickel to above about 140° C. so that the condensation of the nitric acid on the surface of the catalyst ceased; as the temperature reached from about 165° to 175° C. water was partially driven off from the hydrated nitrate film. Passage of the nitric acid vapors over the catalyst was continued for about 1 to 2 hours after condensation of the acid vapors ceased and during th's period the vapors were absorbed by the molten nitrate film and attacked the nickel at the interface between the metal and the molten nitrate, building up a relatively thick, adherent, substantially anhydrous nickel nitrate film. It was found that the cage of nickel had gained approximately 12 per cent in weight.

The cage was then removed from the glass nitrating chamber and placed in a heated chamber where air was passed over the nitrate coated nickel at a temperature of about 300° C. until evolution of brown nitrogen oxide vapors ceased and the nickel was then heated to a temperature of about 340° to 350° C. until decomposition of the nitrate to nickel oxide was complete.

A cylindrical iron vessel 10 of 14" diameter and 46" height containing a cylindrical glass nitrating chamber 15, 6" in diameter and 48" high and a mineral oil bath surrounding the lower portion of the nitrating chamber was employed. Nitric acid of a concentration of 70 per cent was introduced into the bottom of the nitrating chamber to a depth of about 6", steam at a gauge pressure of about 75 pounds per square inch, i. e. a temperature of about 160° C. was passed through coil 12, and the oil bath was heated to a temperature of about 180° to 185° C. by an auxiliary steam coil (not shown on the drawing) through which steam at a gauge pressure of about 200 pounds was passed. A nickel screen cage 4" in diameter and 36" long filled with nickel turnings and having a 1" diameter nickel tube about 40" long centrally located in the cage was introduced at a temperature of about 30° C. into the nitrating chamber so that the lower end of the glass tube 17 was about 4" to 5" below the level of the nitric acid. Air was passed downwardly through the tube and bubbled upwardly through the nitric acid at a rate of about 3 cubic feet per hour, thus assisting nitric acid vapors to ascend through the catalyst. For about 30 minutes the nitric acid vapors condensed on the catalyst and reacted therewith to form a thin, uniform film of hydrated nickel nitrate; the temperature of the catalyst had then risen to about 150° C., i. e. above the condensation point of the nitric acid vapors owing to the heat evolved by the exothermic reaction and supplied by the steam coil. Passage of the vapors was continued for about 1 hour after condensation of the vapors ceased and during this period the temperature of the catalyst rose to about 190° C., the vapors were absorbed by the molten nitrate film and attack on the nickel continued building up a thick, adherent, substantially anhydrous nickel nitrate film. It was found that the cage of nickel had gained in the neighborhood of 10 per cent in weight after passage of the nitric acid vapors thereover for a period of about 1½ hours. The nickel nitrate coated catalyst was heated in air as described in Example I to decompose the nitrate and form an adherent, rugged, active catalytic layer of nickel oxide.

Catalysts prepared in accordance with the examples were employed for the vapor phase hydrogenation of phenol to cyclohexanol, hydrogenation of cresol to methyl cyclohexanol, hydrogenation of benzene to cyclohexane, hydrogenation of toluene to methyl cyclohexane, and dehydrogenation of cyclohexanols to cyclohexanones. The catalysts were of great ruggedness and durability and high activity and capacity and the catalytically active film was strongly adherent to the metal.

Catalysts produced in accordance with the invention possess a thick, uniform and strongly adherent film of catalytically active nickel oxide and possess greater activity and durability than catalysts heretofore obtainable by treatment of nickel with nitric acid vapors. Furthermore, the process of the invention may be employed repeatedly to obtain catalysts of good activity, durability and capacity and is characterized by simplicity and low cost of catalyst preparation. Less time is required for the catalytic activation of nickel in accordance with the invention and reactivation of spent catalyst results in removal of catalyst contaminants as well as formation of catalytically active nickel oxide.

In this specification, reference has been made to the building up of "a relatively thick, adherent, substantially anhydrous nickel nitrate film" by continuing the passage of nitric acid vapors over the catalyst at temperatures above the condensation point. Especially at temperatures above about 165° C., some thermal decomposition of the hydrated nickel nitrate is believed to take place. Accordingly, "substantially anhydrous nickel nitrate" is intended to include basic nitrate and oxides which may be formed by the thermal decomposition of the hydrated nickel nitrate during the vapor nitration of the catalyst at elevated temperatures.

Since it is evident that certain changes may be made in the above without departing from the spirit of the invention, e. g. acid-resistant material other than glass, such as porcelain, may be employed in constructing the nitrating chamber and electric heating elements may be employed in lieu of the steam coil, it is intended that the description should be interpreted in an illustrative and not a limiting sense.

I claim:

1. A process for the preparation of nickel catalyst which comprises passing nitric acid vapors over nickel while the nickel is at a temperature below the condensation temperature of the vapors so that the vapors condense on the nickel and form nickel nitrate, raising the temperature of the nickel above the condensation temperature of the nitric acid vapors and passing additional nitric acid vapors over the nickel.

2. A process of preparing nickel catalyst which comprises passing nitric acid vapors into contact with nickel while the nickel is at a temperature below the condensation temperature of the vapors, thereby causing the vapors to condense on the nickel and react therewith to form nickel nitrate, raising the temperature of the nickel above the condensation temperature of the nitric acid vapors, and passing nitric acid vapors into contact with the nickel while at a temperature above the condensation point of the vapors.

3. A process of producing nickel catalyst which comprises passing nitric acid vapors into contact with nickel at a temperature below the condensation temperature of the vapors, gradually raising the temperature of the nickel above the condensation temperature of the nitric acid vapors and continuing the passage of the vapors over the nickel while at a temperature above that at which condensation of the nitric acid vapors occurs.

4. A process of preparing nickel catalyst which comprises passing nitric acid vapors over nickel while the nickel is at a temperature below about 120° C., raising the temperature of the nickel above about 140° C. and continuing passage of the nitric acid vapors over the nickel after the temperature thereof is above about 140° C.

5. A process of preparing nickel catalyst which comprises passing nitric acid vapors over nickel and raising the temperature of the nickel from below about 120° C. to above about 140° C. and continuing passage of the vapors thereover until a temperature of at least 165° C. is reached.

6. A process of preparing nickel catalyst which comprises passing nitric acid vapors over nickel at a temperature below about 120° C. whereby the vapors condense on the nickel and react therewith to coat the nickel substantially uniformly with hydrated nickel nitrate and simultaneously applying extraneous heat to the nickel to raise the temperature thereof to at least 140° C. so that condensation of acid vapors on nickel ceases, continuing the passage of nitric acid vapors over the nickel while the temperature rises to at least 165° C. so that the hydrated nickel nitrate is partially dehydrated by the removal of water and the nitric acid vapors are absorbed by the molten nitrate and continue to attack the nickel, discontinuing the passage of nitric acid vapors over the nickel and decomposing the nitrate layer to form a catalytically active layer on the nickel.

7. A process of preparing nickel catalyst which comprises placing above a body of concentrated nitric acid maintained at boiling temperature a body of nickel at a temperature below the condensation temperature of the nitric acid vapors, bubbling gas through the nitric acid to assist the vapors to ascend over the nickel whereby the vapors condense on the surface of the catalyst and react therewith to form hydrated nickel nitrate and simultaneously supplying extraneous heat from a zone surrounding the nickel to raise the temperature thereof to at least 140° C. and continuing passage of the nitric acid vapors over the nickel to raise the temperature thereof to at least 165° C.

8. A process of preparing nickel catalyst which comprises placing bulk nickel at about room temperature within a nitrating zone containing a body of boiling concentrated nitric acid located below the nickel, bubbling gas through the nitric acid and assisting the nitric acid vapors to ascend over the nickel whereby the vapors condense on the surface of the nickel and react therewith to form a substantially uniform coating of hydrated nickel nitrate, and simultaneously supplying extraneous heat from a source surrounding the nitrating zone to raise the temperature of the nickel to above about 140° C. within about 10 to 30 minutes after the introduction of the nickel into the zone whereby condensation of the acid vapors on the nickel ceases, and continuing the passage of the nitric acid vapors over the nickel until the temperature thereof rises to at least about 165° C., whereby the hydrated nickel nitrate is partially dehydrated by the removal of water and the nitric acid vapors are absorbed by the molten nitrate acid and continue to attack the metal thereby increasing the thickness of the nickel nitrate coating.

9. A process of preparing nickel catalyst comprising placing bulk nickel in a nitrating zone, passing nitric acid vapors over said nickel while the nickel is at a temperature below the condensation temperature of the vapors so that the vapors condense on the nickel and form nickel nitrate, raising the temperature of the nickel above the condensation temperature of the nitric acid vapors within from approximately 10 to approximately 30 minutes after condensation of the acid vapors on the nickel begins, and continuing passage of the nitric acid vapors over the nickel while the nickel is at a temperature above the condensation point of the vapors for a longer period than the period during which condensation of the vapors on the nickel was effected to thicken the coating of nickel nitrate on the nickel.

10. A process of preparing nickel catalyst comprising placing bulk nickel in a nitrating zone, passing nitric acid vapors over said nickel while the nickel is at a temperature below the condensation temperature of the vapors so that the vapors condense on the nickel and form nickel nitrate, applying extraneous heat to the nickel so as to raise the temperature thereof above the condensation temperature of the nitric acid vapors within from approximately 10 to approximately 30 minutes after condensation of the acid vapors on the nickel begins and continuing passage of the nitric acid vapors over the nickel for a period of from approximately 1 to approximately 2 hours after condensation of the vapors on the nickel ceases to thicken the coating of nickel nitrate on the nickel.

FRANK ANTHONY SABIA.